United States Patent [19]

Manin

[11] 4,327,813
[45] May 4, 1982

[54] GENERATION OF SEISMIC SOURCES

[75] Inventor: Michel G. Manin, Massy, France

[73] Assignee: Compagnie Generale de Geophysique, Massy, France

[21] Appl. No.: 134,157

[22] Filed: Mar. 26, 1980

[30] Foreign Application Priority Data

Mar. 30, 1979 [FR] France ............................... 79 08022

[51] Int. Cl.³ ............................................. G01V 1/137
[52] U.S. Cl. .................................. 181/120; 367/146; 181/115
[58] Field of Search ................ 367/142, 146; 181/106, 181/110, 113, 115, 120; 122/40; 166/249, 177; 175/1

[56] References Cited

U.S. PATENT DOCUMENTS

| 368,272 | 8/1887 | Batchelder | 181/120 |
|---|---|---|---|
| 515,624 | 2/1894 | Stewart | 181/120 |
| 3,052,615 | 9/1962 | Johns et al. | 122/40 |
| 3,369,217 | 2/1968 | Luehrmann et al. | 181/113 |
| 3,712,408 | 1/1973 | Muntz | 181/120 |
| 3,858,171 | 12/1974 | Pauletich | 367/146 |
| 3,859,954 | 1/1975 | Pauletich | 181/113 |
| 3,912,042 | 10/1975 | Pauletich | 367/146 |
| 3,944,019 | 3/1976 | Pauletich | 181/120 |
| 4,015,684 | 4/1977 | Pauletich | 181/120 |

FOREIGN PATENT DOCUMENTS 18025 6/1968 United Kingdom ............... 367/146

OTHER PUBLICATIONS

Osborne et al., "The Acoustical Concomitants of Cavitation and Boiling, Produced by a Hot Wire, I", 1/47, pp. 13-29, Journ. Acoust. Soc. of America, vol. 19, #1.

Primary Examiner—Nelson Moskowitz
Attorney, Agent, or Firm—Schwartz, Jeffery, Schwaab, Mack, Blumenthal & Koch

[57] ABSTRACT

The invention relates to the creation of a shock wave within a mass of water by implosion of a vapor bubble.

According to the invention, a controlled quantity of liquid water under pressure and which is super-heated relative to the mass of water is released quickly, at a predetermined point of the mass of water, the water advantageously being in the lower vicinity of the left-hand part of the saturation curve (portion B-D). The water liberated in this way expands and vaporizes at least partially in the form of a single bubble, which then implodes suddenly.

Application as a marine seismic source.

10 Claims, 4 Drawing Figures

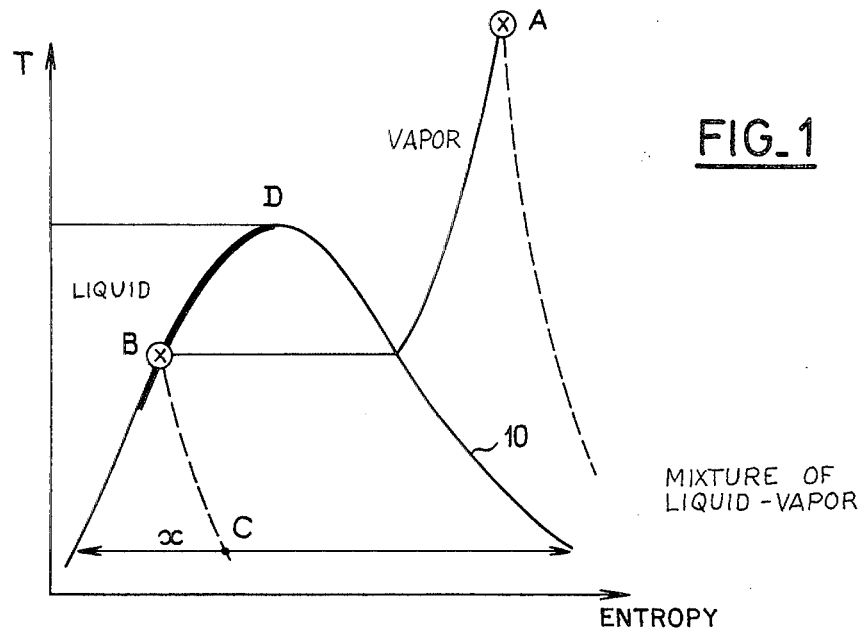
FIG_1
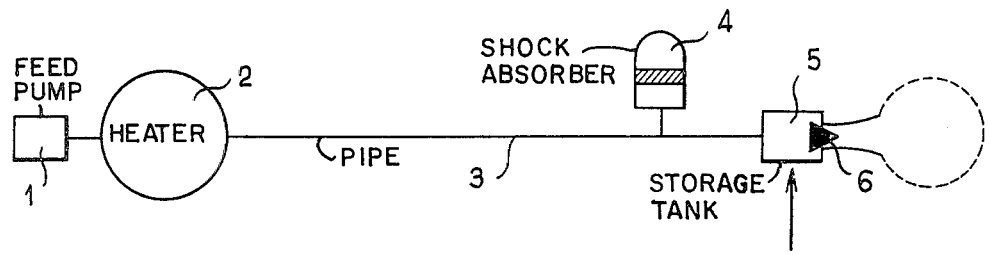
FIG_2
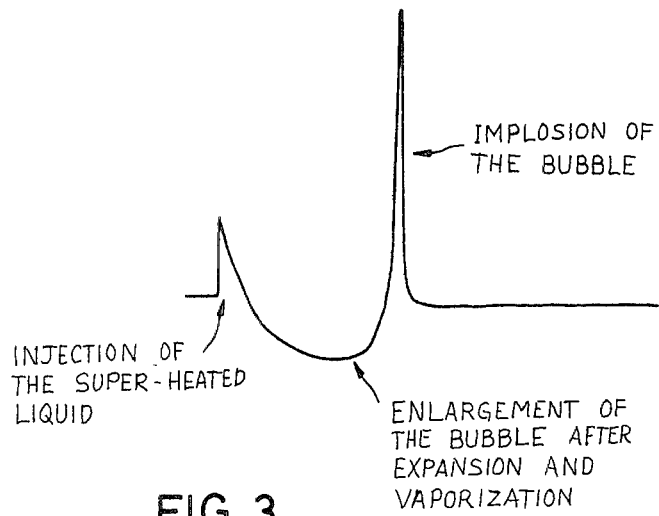
FIG_3
| SATURATION CURVE | |
|---|---|
| Bars | °C |
| 5 | 152 |
| 10 | 180 |
| 20 | 212 |
| 40 | 250 |
| 60 | 276 |
| 100 | 311 |
| 150 | 342 |
| 200 | 366 |
| 226 | 374 |
FIG_1A

GENERATION OF SEISMIC SOURCES

The invention relates to artificial seismic sources used in geophysical marine prospecting.

In French Pat. No. 69 26 481 and its additions (Nos. 70 28 731 and 77 15 959), there is described a method and installation for creating a shock wave within a mass of water, for the purpose of geophysical studies of the seismic prospecting type. According to this technique, steam is produced at a predetermined temperature and pressure, a certain volume of steam is liberated suddenly at the desired depth in the mass of water, which volume of steam expands in the form of a single bubble of large size, which then condenses suddenly, thus creating an implosion which generates a high energy shock wave.

Used for several years by the Applicant, this marine seismic source has considerable advantages: a true implosion creating a shock wave which is advantageous for seismic studies, and it is non-polluting. However, its application requires elaborate precautions, since it is necessary to keep the steam under desired conditions of temperature and pressure until its point of liberation. (The distance between the boiler and the point of liberation of the steam is currently of the order of 50 meters). This necessitates special heat-insulating arrangements, as well as a significant consumption of energy in order to bring the steam to and keep it under the required conditions.

Furthermore, this consumption of energy is dependent on the useful energy desired for the implosion, which is linked principally with the pressure of the steam produced. Economic as well as technological constraints mean that at the present time the steam pressure is in practice limited to 100 bars.

The present invention intends to improve the performance of marine seismic souces of the above mentioned type.

In a quite surprising manner, experiments carried out by the Applicant have shown that it is possible to obtain a marine seismic source by liberating a small quantity of super-heated liquid at the desired point, rather than a large volume of steam.

The liquid is so called "super-heated", since it is at a high temperature and under high pressure (for example 60 bars, 276° C.); since it is subject to ambient conditions at the time of its liberation, it is transformed immediately into steam.

Thus, according to the invention, at a predetermined point of the mass of water, a controlled quantity of liquid water under pressure and which is super-heated relative to the mass of water is liberated quickly, which water expands and vaporizes to form a singe bubble, which then implodes suddenly.

Very advantageously, the water liberated is in the lower vicinity of nascent vaporization. In practice, the water liberated is at a temperature at the most equal to approximately 374° C. and at a pressure at the most equal to approximately 226 bars (critical point of water).

In order to achieve the greatest benefit from the invention, the water liberated is under conditions which are close to but lower values than the critical point.

However, when one does not wish for a very considerable implosion, it is sufficient that the water liberated is at a pressure greater than approximately 5 bars and at a temperature higher than approximately 150° C.

Under the operating conditions presently considered as preferable, the water liberated is at a pressure greater than approximately 50 bars and at a temperature greater than approximately 250° C.

An installation for carrying out the method conventionally comprises a source of hot fluid under pressure connected by a length of pipe to a tank, mounted on which or close to which is a valve for liberating the fluid. According to the invention, the source delivers liquid water under pressure and which is super-heated and the valve is a sudden release liquid injector.

Preferably, the installation comprises a shock absorber connected in the pipe between the heater and the tank.

Advantageously, the source of super-heated pressurised liquid comprises a pump followed by a heater.

Further features and advantages of the invention will become apparent on reading the ensuing detailed description, made with reference to the accompanying drawing, given in order to illustrate a non-limiting example of the invention and in which:

FIG. 1 is a temperature entropy diagram of pure water and FIG. 1A is a corresponding table;

FIG. 2 is a basic diagram of one embodiment of an installation for carrying out the method according to the invention and FIG. 3 is a time diagram illustrating the wave form or "signature" of the implosion of a bubble of steam obtained according to the invention.

The entropic diagram of pure water given in FIG. 1 shows the saturation curve 10. The marine seismic sources used hitherto by the Applicant according to the teachings of the above mentioned French Patent and its aforementioned additions generally operate at the point A of the diagram of FIG. 1, where the temperature is 400° C. and where the pressure is 60 bars. Such cases involve super-heated steam, which is injected into the water through a valve provided with a siphon, in order to produce the bubble of steam which is to implode.

According to the present invention, it has been proposed to inject not steam into the water, but liquid preferably in the lower vicinity of nascent vaporization. In practice, it has proved desirable that the marine seismic source with injection of liquid according to the invention operates between a point close to the point B (60 bars, 276° C.) and the critical point D (226 bars, 374° C.). In this case, vicinity is understood to mean lower values, so as to have solely liquid with the exclusion of any steam, that is to say that the point representing the liquid on FIG. 1 should be located slightly to the left of the saturation curve (pressures and temperatures defined by FIG. 1A).

As mentioned preferably, if it is preferable to operate between the points B and D, it is possible to carry out the invention by being located slightly to the left of any point of the ascending left hand part of the saturation curve, the pressure being able to drop for example to 10 bars. Naturally, in such cases, one obtains a shock wave of less energy.

Now, assuming that the method according to the invention is carried out by injecting water in the vicinity of the point B, the water injected expands suddenly in the sea water and its condition follows the line B-C drawn in broken line, i.e. the liquid vaporizes, in a manner similar to what happens when a bottle of champagne is opened. Thus a bubble of vapour is created, of size x, which expands then implodes thus creating a shock wave. It will be seen that a notion of size comes into being, i.e. that all the liquid is not transformed into vapour, but only a part of the latter. In this respect it will be noted that the higher up the left hand part of the saturation curve, the greater the rate of vaporization of the liquid liberated, the vaporization being virtually total when the liquid liberated is virtually at the critical point.

The method of the present invention provides numerous advantages with respect to previous methods:

To bring 1 Kg of cold water to the point A, requires 3.2 Mjoules, whereas to bring 1 Kg of cold water to the point B, according to the present invention, requires 1.2 Mjoules. The invention thus firstly provides a considerable saving of energy.

1 Kg of super-heated vapour is equivalent to 40 liters, whereas 1 Kg of super-heated water, at point B, is equal to 1 liter, thus a small tank is sufficient and there is a considerable saving as regards the weight and volume of the immersed "fluid tubes".

Since the propellent fluid for the implosion is liquid, the energy is very concentrated and takes up little space, which also reduces heat losses. This factor is not negligible in as far as the inversion is generally carried out on board ships, where the sources for producing the fluid are located, whereas the point of liberation of the fluid in the water is generally located at a distance of the order of 50 meters.

Furthermore, it will be noted that by working at the critical point D, one obtains excellent efficiency due to the virtually total vaporization and this is for a consumption of 2.1 Mjoules, whilst obtaining a propelling pressure of 226 bars.

Comparison with the energy required and the pressure obtained at the point A according to prior methods of the Applicant immediately shows the considerable advantages of the present invention.

FIG. 2 illustrates an installation for carrying out the method of the invention.

A feed pump 1 compresses the water after the conventional operations of demineralisation and possibly pre-heating, in order to bring the water to the desired pressure, preferably of between 60 and 226 bars. The heater 2 heats the water to the lower vicinity of the saturation temperature, which occurs between 276° C. and 374° C., according to the pressure chosen. The liquid which is thus pressurised and super-heated then passes into a rigid or flexible pipework 3, in order to be stored in a tank 5, of which it will be noted that it provides a very small volume with respect to previous installations, since 1 Kg of liquid water is equivalent to only 1 liter. It will also be noted that in order to provide seismic blasting of considerable significance, one can even use up to 3 Kg water, or a tank 5 having a volume of 3 liters.

At the time of seismic blasting, the injector 6 suddenly injects the 3 Kg of super-heated water into the sea water. This super-heated water expands, partly vaporizes, according to the quantity as above defined, thus creating a vapour bubble which then implodes in order to produce a shock wave which can be used for seismic prospecting. It will be noted that starting from the point B (60 bars, 276° C.), one obtains a quantity of vapour x equals 50%. As mentioned previously, the quantity increases as one ascends the line B-D, in order to finally reach virtually total vaporization at the critical point.

According to another feature of the invention, at the time of the injection, in order to prevent a reduced pressure wave from re-ascending in the pipework and reaching the heater, thus creating instantaneous vaporization in this pipework and heater, hence dangerous water-hammering, a shock absorber designated by the reference numeral 4 is installed in the pipework 3, preferably in the vicinity of the tank 5. This shock absorber may be constituted by any means able to maintain the pressure in the pipe 3, for example a gas storage tank kept under pressure. A storage tank of this type maintains the working pressure even during seismic blasting, in order to prevent any vaporization upstream of the injector.

With the installation according to the present invention, implosions are obtained whereof the wave forms are of the type illustrated in FIG. 3. The first peak from the left corresponds to the injection of the super-heated liquid, the following trough corresponds to the enlargement of the bubble after expansion and vaporization of a given quantity of liquid and finally the very high peak corresponds to the implosion of the bubble.

It will be seen that the present invention makes it possible to obtain a wave form or signature of the implosion which is comparable with that obtained previously in accordance with French Pat. No. 6926481 by working at point A and this is under better conditions as regards efficiency, bulk and heat losses.

I claim:

1. Method for creating a shock wave within a mass of water by the implosion of a vapour bubble, characterised by the fact that a controlled quantity of liquid water under pressure and which is super-heated relative to the mass of water is liberated quickly, at a predetermined point in the mass of water, so that the liberated water expands and vaporises as a single bubble, which then implodes suddenly.

2. Method according to claim 1, characterised by the fact that the water liberated is in the lower vicinity of nascent vaporisation.

3. Method according to claim 2, characterised by the fact that the water liberated is at a temperature at the most equal to approximately 374° C. and at a pressure at the most equal to approximately 226 bars (critical point of water).

4. Method according to claim 3, characterised by the fact that the water liberated is under conditions which are close to but lower than those of the critical point.

5. Method according to claim 1, characterised by the fact that the water liberated is at a pressure greater than approximately 5 bars and at a temperature higher than approximately 150°.

6. Method according to claim 5, characterised by the fact that the water liberated is at a pressure greater than approximately 50 bars and at a temperature higher than approximately 250°.

7. Apparatus for creating a shock wave within a mass of water by the implosion of a vapour bubble produced from liquid water under pressure, comprising:
   a. means for compressing said water to 5–226 bars,
   b. means for heating said water under pressure to a temperature of 150°–374° C.,
   c. conduit means for conveying said heated and pressurized water to a tank positioned at the area of implosion, and
   d. a liquid injector communicating with said tank for receiving therefrom the super heated water under pressure and injecting the same into the mass of water to effect said implosion.

8. The apparatus of claim 7, further including a shock absorber connected to said conduit means between said heater means and said tank for maintaining the pressure in said conduit means.

9. The apparatus of claim 7, wherein said compressing means comprises a pump.

10. The apparatus of claim 7 wherein said compressing means and said heating means provide, respectively, a pressure between 60 and 226 bars, and a temperature between 276° and 374° C.

* * * * *